(12) United States Patent
Labranche et al.

(10) Patent No.: US 9,894,106 B2
(45) Date of Patent: Feb. 13, 2018

(54) METHOD FOR MANAGING FIXED AND MOBILE TERMINALS IN AN ENVIRONMENT COMPRISING A MOBILE NETWORK INCLUDING IMS NETWORK AND A COMPANY NETWORK

(71) Applicant: Orange, Paris (FR)

(72) Inventors: Miguel Labranche, Bonneuil sur Marne (FR); Bruno Tossou, Montgeron (FR)

(73) Assignee: Orange, Paris (FR)

( * ) Notice: Subject to any disclaimer, the term of this patent is extended or adjusted under 35 U.S.C. 154(b) by 77 days.

(21) Appl. No.: 14/898,735

(22) PCT Filed: Jun. 26, 2014

(86) PCT No.: PCT/FR2014/051629
§ 371 (c)(1),
(2) Date: Feb. 5, 2016

(87) PCT Pub. No.: WO2014/207395
PCT Pub. Date: Dec. 31, 2014

(65) Prior Publication Data
US 2017/0054762 A1 Feb. 23, 2017

(30) Foreign Application Priority Data

Jun. 27, 2013 (FR) ...................................... 13 56242

(51) Int. Cl.
*H04L 29/06* (2006.01)
*H04L 29/08* (2006.01)
(Continued)

(52) U.S. Cl.
CPC ...... *H04L 65/1053* (2013.01); *H04L 65/1016* (2013.01); *H04L 65/1063* (2013.01);
(Continued)

(58) Field of Classification Search
CPC ............. H04L 65/1053; H04L 65/1016; H04L 65/1069; H04L 65/1073; H04W 60/04; H04M 7/009
See application file for complete search history.

(56) References Cited

U.S. PATENT DOCUMENTS

| | | | |
|---|---|---|---|
| 2010/0182997 | A1 | 7/2010 | Yang Lili et al. |
| 2011/0072141 | A1* | 3/2011 | Veenstra ............. H04L 65/1016 709/228 |

FOREIGN PATENT DOCUMENTS

EP    1 968 334 A2    9/2008

OTHER PUBLICATIONS

The International Search Report from the PCT/FR2014/051629 application.

(Continued)

*Primary Examiner* — Jamal Javaid
(74) *Attorney, Agent, or Firm* — Haverstock & Owens LLP (57) ABSTRACT

A method of managing fixed and mobile terminals in an environment comprising a mobile network including an IMS network, and an enterprise network including IP-PBX equipment, the method consisting in particular in:
  determining (S30) the mobile terminals of the mobile network that are registered with the IMS network and the enterprise terminals that are registered with the IP-PBX equipment of the enterprise network;
  while a multimedia communications session involving any terminal that is determined as being registered with the IMS network or with the IP-PBX equipment as the case may be, is being initialized via the IMS network, obtaining (S32) the capabilities of said terminal; and
  updating (S31, S33) a database with information identifying the mobile terminals of the mobile network that are registered with the IMS network and the enterprise (Continued)

terminals that are registered with the IP-PBX equipment, and with information representative of the capabilities that have been obtained for each identified terminal.

15 Claims, 5 Drawing Sheets

(51) Int. Cl.
*H04M 7/00* (2006.01)
*H04W 60/04* (2009.01)

(52) U.S. Cl.
CPC ...... *H04L 65/1069* (2013.01); *H04L 65/1073* (2013.01); *H04L 67/303* (2013.01); *H04M 7/009* (2013.01); *H04W 60/04* (2013.01)

(56) References Cited

OTHER PUBLICATIONS

Kim Lynggaard Larsen et al., "Corporate Convergence with the 3GPP IP Multimedia Subsystem", Next Generation Mobile Applications, Services and Technologies, Sep. 1, 2007, XP031142476.
"3rd Generation Partnership Project: Technical Specification Group Services and System Aspects; IP Multimedia Subsystem (IMS) centralized services; Stage 2 (Release 12)", 3GPP Standard,XP050692717.
The Written Opinion from the PCT/FR2014/051629 application.

\* cited by examiner

METHOD FOR MANAGING FIXED AND MOBILE TERMINALS IN AN ENVIRONMENT COMPRISING A MOBILE NETWORK INCLUDING IMS NETWORK AND A COMPANY NETWORK

The invention relates to the general field of telecommunications.

The invention relates more precisely to managing fixed and mobile terminals in an environment comprising an operator's mobile network including an Internet protocol (IP) multimedia subsystem (IMS), an enterprise network including Internet protocol-based private branch exchange (IP-PBX) equipment, and an IP network providing interconnection between the enterprise network and the mobile network.

In particular, the invention relates to a method of managing fixed and mobile terminals in such an environment, and also to an application server of the IMS network, in which server the method is performed.

The invention lies in particular in the context of the network known as VINE (3GPP voice interworking with enterprise IP-PBX) that is being standardized by the 3GPP and that is described in particular in the 3GPP document TR 22.809 entitled "Feasibility study on support for 3GPP voice interworking with enterprise IP-PBX (VINE)", Release 11, V11.2.0, September 2011. The above-mentioned document defines a model enabling a mobile operator's mobile network to interoperate with an enterprise network.

A preferred but non-limiting application of the invention lies in particular in the context of the IMS centralized service (ICS) that has been developed by the third generation partnership project (3GPP) standards organization and that is described in particular in the 3GPP document TS 23.292 entitled "Technical specification group services and system aspects; IP multimedia subsystem (IMS) centralized services; Stage 2", Release 12, V12.1.0, March 2013.

Figure 1:
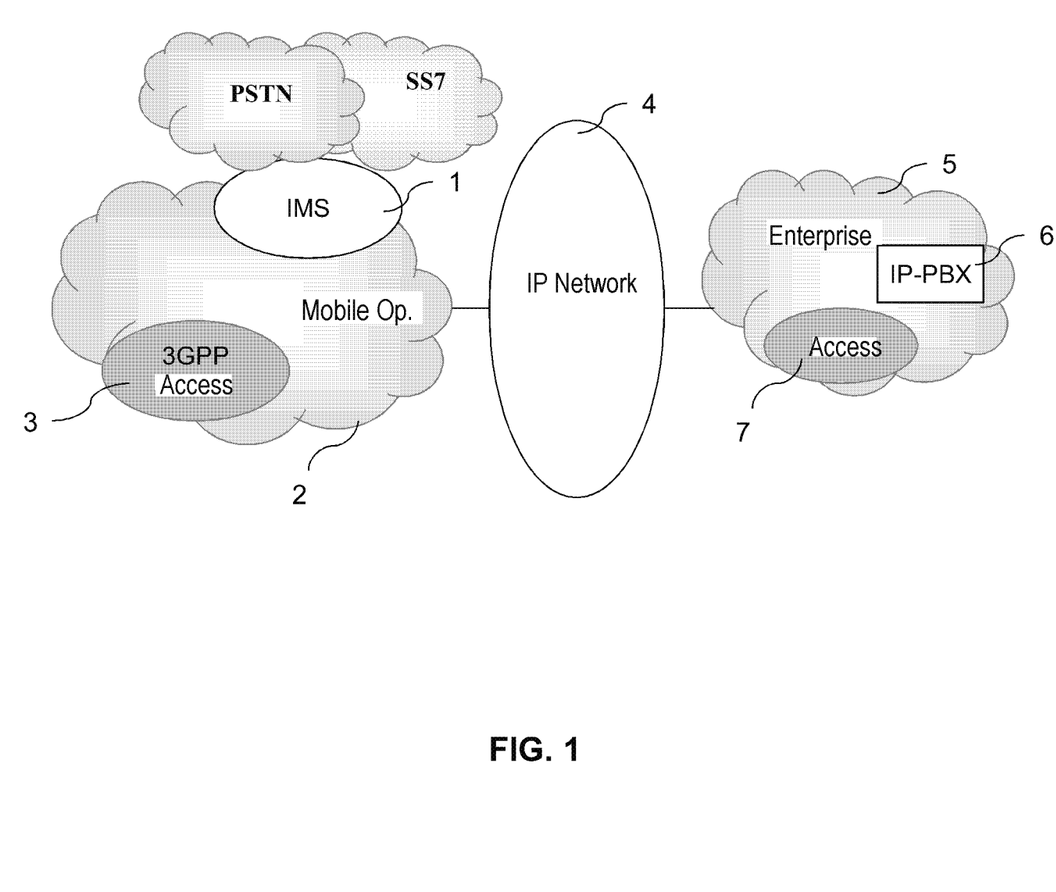
FIG. 1, described above, is a diagram showing an environment in compliance with the VINE model in which an operator's mobile network interacts with an enterprise network, and in which the invention can be implemented.

FIG. 1 is taken from 3GPP document TR 22.809 and shows the VINE reference model. As shown in FIG. 1, in the modelled environment, the operator's mobile network comprises an IMS network (1) that is connected to a public switched telephone network (PSTN) and to a telephone network with SS7 signaling, and at least one 3GPP mobile access network (3).

The enterprise network (5) comprises fixed and/or wireless access networks (7) and IP-PBX equipment (6). The wireless access networks may either be 3GPP wireless access networks or non-3GPP wireless access networks (e.g. wireless local area networks (WLAN)), and the fixed-line access networks may be wired IP access networks of any type. The enterprise network is connected to the mobile operator's core network via an IP network by using two types of connection: one from the enterprise access network 7 to the mobile operator's core network 2; and another from the IP-PBX equipment 6 to the mobile operator's IMS network 1.

In the context of an environment such as VINE, the operator's mobile network must not only manage the mobile terminals that connect to the mobile network via its mobile access network(s) (3), but it must also manage the terminals of the enterprise network involved in communications sessions set up with the IMS core network (1) or with the mobile core network (2).

Under such conditions, there exists a need—that is not presently covered by the 3GPP specifications for VINE—for a terminal management method that handles the management of all of the terminals connected in such an environment, regardless of whether they are situated at the enterprise end or at the mobile operator's network end.

The present invention seeks in particular to satisfy the need set out above. To this end, in a first aspect, the invention provides a method of managing fixed and mobile terminals in an environment comprising an operator's mobile network including an IMS network, an enterprise network including IP-PBX equipment, and an interconnection IP network between the enterprise network and the mobile network. According to the invention, the method is performed in a management server and comprises steps consisting in:
  determining the mobile terminals of the mobile network that are registered with the IMS network and the enterprise terminals that are registered with the IP-PBX equipment of the enterprise network;
  while a multimedia communications session involving any terminal that is determined as being registered with the IMS network or with the IP-PBX equipment is being initialized via the IMS network, obtaining the capabilities of that terminal, which capabilities are defined by at least one parameter from a set of parameters including a media type that can be accepted by the terminal and the bandwidth needed for setting up a multimedia communications session with the terminal; and
  updating a database with information identifying the mobile terminals of the mobile network that are registered with the IMS network and the enterprise terminals that are registered with the IP-PBX equipment, and with information representative of the capabilities that have been obtained for each identified terminal.

In a telecommunications environment such as the VINE environment, it is thus possible, by means of the terminal management method of the invention, to have a database that is regularly updated and that contains the list of all the terminals—both in an operator's mobile network and in an enterprise network—as a result of determining that the terminals have become registered either with the IMS network or with the IP-PBX equipment of the enterprise network, which list also includes the capabilities of each of the terminals in the list. In this way, by means of the information stored in the database that is maintained by the management server of the invention, centralized management means are made available in this type of environment, which means are provided by the operator of the mobile network.

According to an implementation characteristic of the invention, the method includes a step of making information stored in the database available in response to a request from determined equipment of said environment.

Thus, the information stored in the database is made available on receiving a request from determined equipment of the environment—such as a service application server or a user terminal—for the purpose of enriching an application performed by that equipment.

In particular, according to particular implementation features of the invention:
  the mobile terminals registered with the IMS network are determined by interrogating a service centralization and continuity application server (SCC-AS) of the IMS network in compliance with the ICS standard (as described in the above-mentioned 3GPP document TS 23.292);
  the enterprise terminals registered with the IP-PBX equipment are determined by the management server as a result of communication with the IP-PBX equipment.

Thus, when applied to the VINE environment, the management server of the invention, which in one implementation is situated in the IMS network, can act effectively to centralize the registration information and the capabilities of all of the terminals of the environment. The database thus serves to store information identifying any terminal of the environment as a result of a first registration of the terminal, even if the terminal deregisters subsequently.

In particular implementations of the invention, provision may be made for:

the management server periodically to interrogate the IP-PBX equipment using a communications protocol based on the IP protocol in order to obtain a list of terminals registered with the IP-PBX equipment; or the management server to receive, while an enterprise network terminal is being registered with the IP-PBX equipment, a message from the IP-PBX equipment providing information about the registration of the terminal; or the IP-PBX equipment periodically to transmit to the management server a list of enterprise terminals registered with the IP-PBX equipment.

Whatever the implementation selected, these implementations enable the database made available by the management server of the invention to provide information about the registration and the capabilities of terminals of the environment, which information is representative of an almost instantaneous status of the environment.

In particular, provision may be made for the database to be updated as soon as it is determined that a terminal is registered with the IMS network or with the IP-PBX equipment.

In practice, on a terminal being deregistered, the terminal remains identified in the database, together with information about the network to which it belongs and information about its current registration or deregistration status.

In an implementation of the invention, the capabilities of a terminal identified in the database are obtained by means of the SCC-AS server by analyzing signaling messages transmitted by the terminal while setting up a multimedia communications session via the IMS network.

In particular, in an implementation, the capabilities of a terminal are obtained by analyzing signaling messages transmitted using the session description protocol (SDP) while setting up a multimedia session via the IMS network involving the terminal.

In the context of the ICS standard, such a multimedia session may make use of a protocol such as the session initiation protocol (SIP).

In a particular implementation of the invention, the database is made available by the management server via a web address pointing to the database and implemented in an application programming interface (API) type interface incorporated in a service application server on the IMS network or in a service application installed in a user terminal.

In this way, a software application incorporated in a user terminal or in a service application server and performing a service that requires communication with all of the terminals of the mobile network or of the enterprise network that are registered or that are capable of being registered, or that requires knowledge of the capabilities of a determined set of terminals of the environment, can obtain this information by making a request to the management server of the invention.

Correspondingly, in a second aspect, the invention provides a management server for managing fixed and mobile terminals in an environment comprising an operator's mobile network including an IMS network, an enterprise network including IP-PBX equipment, and an interconnection IP network between the enterprise network and the mobile network. In accordance with the invention, the management server comprises:

a module for determining the mobile terminals of the mobile network that are registered with the IMS network and the enterprise terminals that are registered with the IP-PBX equipment of the enterprise network;

a module for acting, while a multimedia communications session involving any terminal that is determined as being registered with the IMS network or with the IP-PBX equipment as the case may be, is being initialized via the IMS network, to obtain the capabilities of that terminal, which capabilities are defined by at least one parameter from a set of parameters including a media type that can be accepted by the terminal and the bandwidth needed for setting up a multimedia communications session with the terminal; and a module for updating a database with information identifying the mobile terminals of the mobile network that are registered with the IMS network and the enterprise terminals that are registered with the IP-PBX equipment, and with information representative of the capabilities that have been obtained for each identified terminal.

According to embodiment features of the invention, the server comprises means suitable for performing a terminal management method as described above, and in particular such a server includes a module for making available information that is stored in the database on receiving a request from determined equipment of the environment.

In a particular embodiment, the management server of the invention is distinct from an SCC-AS server defined by the ICS standard. In this embodiment, the management server is suitable for communicating with such an SCC-AS server in order to obtain information about registration in the IMS network of terminals of the mobile network.

In another embodiment of the invention, such a management server of the invention may be incorporated in an SCC-AS server complying with the ICS standard.

Finally, in a last aspect, the present invention also provides a computer program (or a set of software modules) stored on a data medium for performing a terminal management method of the invention, as briefly set out above. The program may in particular be incorporated in a management server of the invention that is situated, in one embodiment, in an IMS core network managed by a mobile network operator, or else that is incorporated directly in an SCC-AS server of the IMS network.

Furthermore, such a computer program of the invention may use any programming language, and may comprise programs in the form of source code, object code, or code intermediate between source code and object code, such as in a partially compiled form, or in any other desirable form.

Consequently, the invention also provides a computer-readable data medium including computer program instructions. Such a data medium may be constituted by any entity or device capable of storing such a program. For example, the medium may comprise storage means, such as a read only memory (ROM), e.g. a compact disk (CD) ROM, or a microelectronic circuit ROM, or indeed removable recording means such as a universal serial bus (USB) key or magnetic recording means, such as a hard disk. Furthermore, provision may be made for a set of software modules of the invention to be accessible by downloading via an Internet type network.

The advantages provided by the above-mentioned management server of the invention and by a computer program of the invention, as briefly set out above, are identical to or contribute to those mentioned above with reference to the terminal management method of the invention, and consequently they are not recalled at this point.

Other features and advantages of the present invention appear from the following detailed description which refers to the accompanying drawings, in which.

FIG. 1, described above, is a diagram showing an environment in compliance with the VINE model, in which an operator's mobile network interacts with an enterprise network, and in which the invention can be implemented. The VINE model (3GPP voice interworking with enterprise IP-PBX) lies in particular in the context of communications services defined by the IMS centralized services (ICS) standard defined in the above-mentioned 3GPP document TS 23.292.

In general manner, the ICS service seeks to make multimedia services available to a mobile user via an IMS core network and independently of the access network to which the user is connected (i.e. a circuit-switched access network or a packet-switched access network). The users of circuit-switched access networks can thus benefit from new IMS services while continuing to benefit from the services traditionally made available by circuit-switched access networks, which IMS services are managed by the IMS core network. For this purpose, the ICS service relies in particular on triggering a service centralization and continuity application server (SCC-AS) in charge of ensuring service continuity for the various access networks. The functions of the SCC-AS server are described in greater detail in the 3GPP document TS 24.292 entitled "Technical specification group core network and terminals; IP multimedia (IM) core network (CN) subsystem centralized services (ICS); Stage 3", Release 11, V11.4.0, March 2013.

Figure 2:
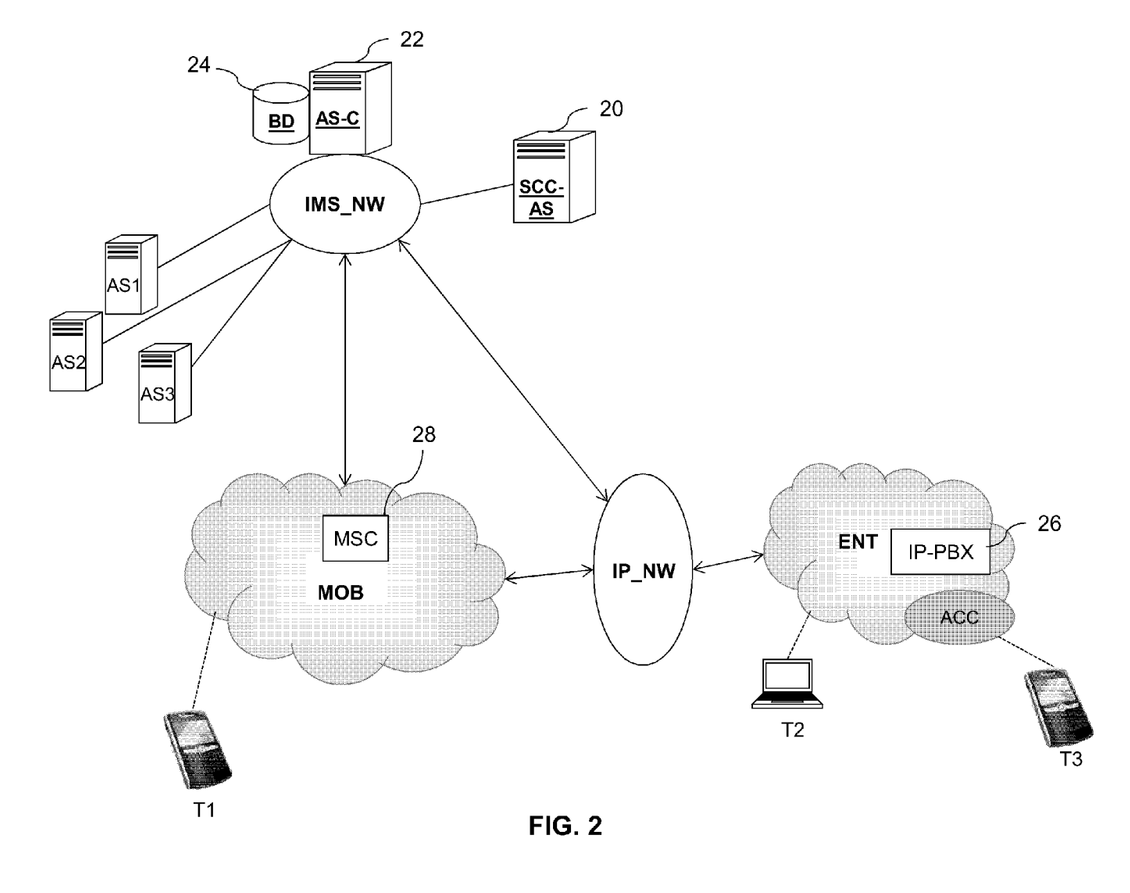
FIG. 2 is a diagram of a VINE type environment in which a terminal management method in accordance with the invention is implemented.
Figure 3:
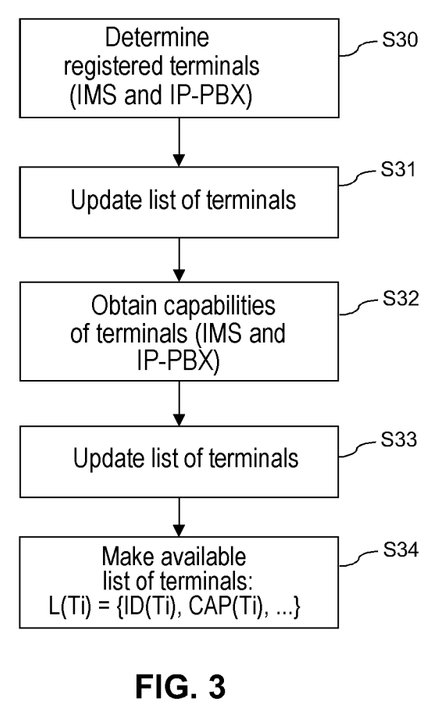
FIG. 3 is a flow chart showing the main steps of a terminal management method of the invention.

With reference to FIGS. 2 and 3, there follows a description of an implementation of a terminal management method of the invention.

FIG. 2 is a diagram showing a VINE type environment in which a terminal management method in accordance with the invention is implemented.

In the chosen implementation as shown, the terminal management method of the invention is performed in a management server 22 associated with a database BD (24) of an IMS network (IMS_NW) forming part of a mobile network (MOB) managed by a mobile telephony operator. The mobile network and the IMS network are interconnected with an enterprise network ENT via an IP network (IP_NW). The IMS network (IMS_NW) includes an SCC-AS server (20) complying with the specifications defined in 3GPP documents TS 23.292 and TS 24.292. Furthermore, applications servers AS1 to AS3 providing various services are connected to the IMS network.

The mobile network MOB includes mobile switching center (MSC) equipment that is enriched to accommodate ICS functions (enhanced MSC). In order to obtain more details on the operation of the MSC equipment, reference may be made by way of example to the 3GPP document TS 23.292: "Interworking between the IP multimedia (IM) core network (CN) subsystem and MSC server for IMS centralized services (ICS)" (Release 11, V11.5.0, March 2013). The MSC equipment (28) acts in particular to route a call or a communications session within the mobile network (MOB) and to provide interconnection with the other networks (IMS, IP).

In particular, the MSC equipment (28) is involved in routing multimedia communications sessions or calls set up between a mobile terminal T1 (smartphone, tablet, mobile telephone, etc.) connected to the mobile network MOB, and a fixed terminal T2 (laptop computer, IP telephone, . . . ) connected to the enterprise network ENT, or a mobile terminal T3 (e.g. an enterprise mobile telephone) connected to the network ENT via a wireless access network (ACC).

Communications within the enterprise network are managed by Internet protocol-based private branch exchange (IP-PBX) equipment 26 that also provides connections between terminals of the enterprise network and the IMS network (IMS_NW) via the IP network (IP_NW).

At this point, it may be observed that in the chosen implementation as shown, the management server (AS-C, 22) of the invention is situated in the IMS network (IMS NW), however it is possible to envisage other implementations in which the management server is connected to some other network, e.g. the core of the mobile network (MOB), and communicates via equipment of the mobile network, such as the MSC (22), with equipment of the IMS network, such as the SCC-AS server (20).

FIG. 3 is a flow chart showing the main steps of the terminal management method of the invention. As shown in FIG. 3, the method comprises a step S30 of determining the mobile terminals of the mobile network that are registered with the IMS network, and the enterprise terminals that are registered with the IP-PBX equipment (26) of the enterprise network.

In order to obtain the registration information concerning the mobile terminals of the mobile network MOB, the AS-C server 22 uses a request-response mechanism to interrogate the SCC-AS server (20) of the IMS network, and because it acts in the mechanism for registering and deregistering mobile terminals (T1) with the IMS network in compliance with the IMS and ICS standards, the SCC-AS server has available a list that is continuously updated of all of the terminals of the network MOB that are registered at any given instant.

In a variant implementation in which the AS-C management server (22) is the same as the SCC-AS server (20)—i.e. in which the functions of the AS-C server are implemented in the form of additional modules in the SCC-AS server— the information about registration of mobile terminals with the IMS network is directly accessible in the management server.

The procedures for IMS registration and deregistration of a mobile terminal in compliance with the ICS standard are described in particular in sections 7.2.1.2 and 7.2.1.3 of the 3GPP document TS 23.292.

Still in step S30, the AS-C server also determines the terminals of the enterprise network that are registered with the IP-PBX equipment. For this purpose, the AS-C management server, or depending on the chosen implementation, the SCC-AS server itself, communicates with the IP-PBX 26 in order to obtain the list of enterprise terminals (T2, T3, . . . ) that are registered.

In an implementation, the AS-C management server periodically interrogates the IP-PBX using a communications protocol based on the IP protocol in order to obtain a list of the terminals registered with the IP-PBX. This protocol may for example be a standardized protocol such as the hypertext transfer protocol (HTTP) or the session initiation protocol (SIP), or it may be a proprietary protocol.

In a variant implementation, the IP-PBX equipment may be adapted so that on registering an enterprise network terminal with the IP-PBX equipment, it transmits a message via the IP network (IP NW) to the AS-C management server containing information about the registration of the terminal.

In another variant implementation, the IP-PBX equipment may be adapted to act periodically to transmit a list to the management server specifying the enterprise terminals that are registered at a given instant with the IP-PBX.

By way of example, the above variant may be performed in the IP-PBX by means of a command, e.g. of the form "sip show registry" (command example used with an Asterisk™ IP-PBX) that is executed by means of a batch file, serving to act periodically to transmit to the AS-C server information about the terminals registered with the IP-PBX.

After the AS-C management server has acted in a step S31, to obtain information about the registration of terminals connected to the network MOB or to the network ENT, a list of registered terminals is updated in the database 24 associated with the management server 22, the list including in particular an identifier of the terminal specifying the type of terminal, e.g. as a function of the terminal's type of access network and/or originating network (MOB, ENT), together with information about the status (active or inactive) of the registration of the terminal with the corresponding equipment (SCC-AS or IP-PBX).

It may be observed at this point that the AS-C management server detecting the registration of a terminal by using the above-explained mechanisms is a process that enables the terminals that are present in the global environment to be "discovered" or identified. Once a terminal is identified on first registration, it remains listed in the list maintained in the database 22. Furthermore, the term "list" is used herein to represent any kind of data structure suitable for storing the above-mentioned information about the terminals of the environment (tables, tree structures, etc.).

The following step S32 is a stage of the AS-C management server "discovering" the capabilities of the terminals of the global environment. To this end, in the implementation in which the functions of the AS-C server are performed in the SCC-AS server, the capabilities of a terminal as previously registered with the IMS network or with the IP-PBX network, as appropriate, are obtained by the SCC-AS server while a multimedia communications session is being initialized via the IMS network involving the terminal in question. In practice, it is possible to make use of SIP multimedia communications sessions, which pass via the SCC-AS equipment using the ICS standard.

In particular, the target capabilities of a terminal are defined by at least one parameter from a set of parameters including a media type that can be accepted by the terminal and the bandwidth needed for setting up a multimedia communications session with the terminal. Nevertheless, other types of parameter relating to the capabilities of the terminal may be detected, depending on the chosen implementation, e.g. physical characteristics of the terminal such as the size of its screen.

When the AS-C server is distinct from the SCC-AS server, then the capabilities of registered terminals may be obtained by the AS-C server interrogating the SCC-AS server.

In the chosen implementation, the capabilities of a terminal identified in the database are obtained by means of the SCC-AS server analyzing signaling messages transmitted by the terminal while setting up a multimedia communications session via the IMS network. In practice, in the presently-described implementation, multimedia sessions are SIP protocol sessions and the signaling messages are transmitted in compliance with the session description protocol (SDP) as standardized by the Internet engineering task force (IETF). Naturally, other protocols could be used in the context of the invention.

More precisely, parameters representative of the capabilities of a terminal may be extracted in particular from the "session description" and "media description" fields of an SDP message. In particular, the information about the bandwidth and the audio and video codecs used by the terminal can be extracted from the "media description" field, respectively from its subfields 'b=' and 'm='.

Returning to FIG. 3, once the parameters representing the capabilities of a given terminal have been obtained, these parameters are stored (step S33) in the database 24 maintained by the management server 22, in association with information identifying the mobile terminals of the mobile network that are registered with the IMS network, and the enterprise terminals that are registered with the IP-PBX equipment, e.g. in the form of a list or table {ID(Ti),CAP (Ti), . . . } where ID(Ti) designates at least one identifier of the terminal Ti and CAP(Ti) is a list of parameters representative of particular characteristics of the terminal Ti (the capabilities of the terminal).

The database is thus regularly updated with information identifying the terminals in the global environment (the networks MOB and ENT) and with the capabilities that have been obtained for each identified terminal in the database. In particular, the database is updated as soon as it is observed that a new terminal has been registered with the IMS network or with the IP-PBX equipment.

The following step, S34, is the AS-C management server (22) responding to a request from a determined piece of equipment in the environment by making available the information stored in the list of terminals as obtained in this way. In particular, in an implementation, the information stored in the database is made available by the management server by means of a web address (or uniform resource locator (URL)) pointing to a web server giving access to the database. Such an address for accessing the database may thus be implemented in an application programming interface (API) type interface that is incorporated in a service application server, such as the servers AS1 to AS3 (FIG. 2) on the IMS network, or in a service application installed in a user terminal.

Figure 4:
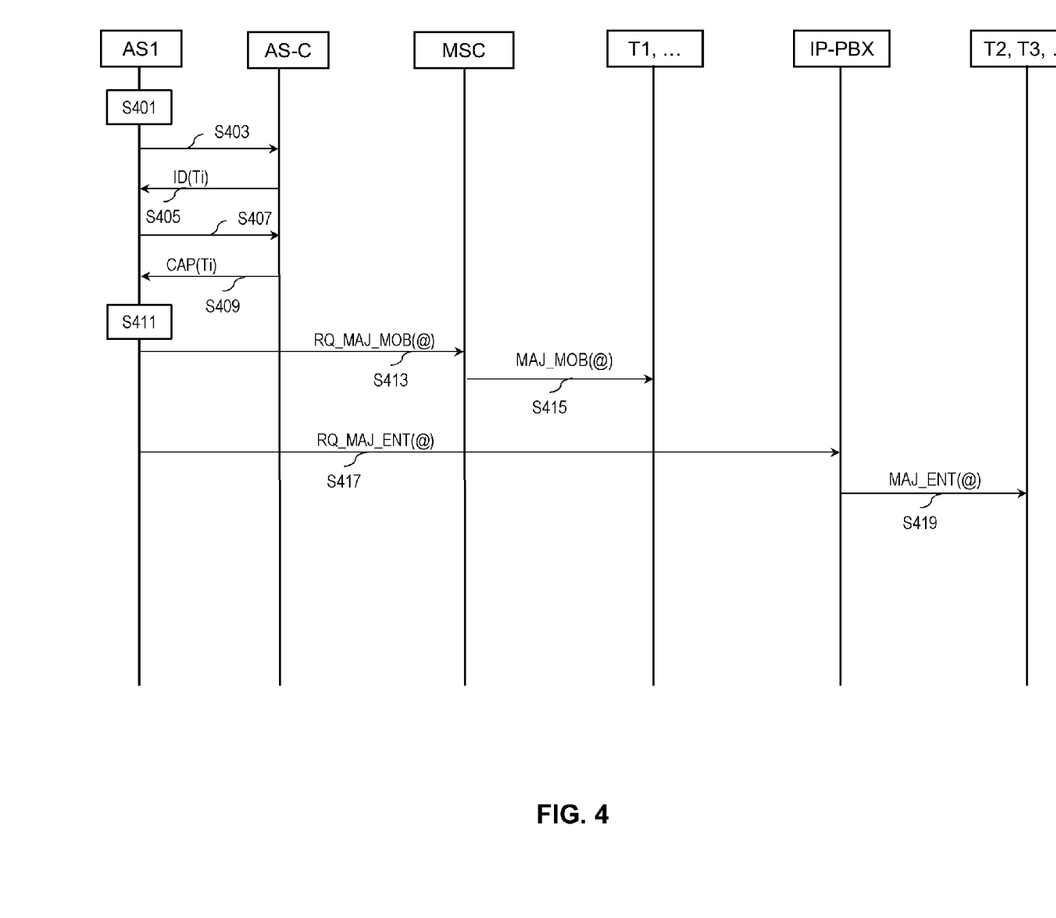
FIGS. 4 and 5 are signal exchange diagrams showing respectively first and second examples of how a database operated by a management server of the invention can be used.
Figure 5:
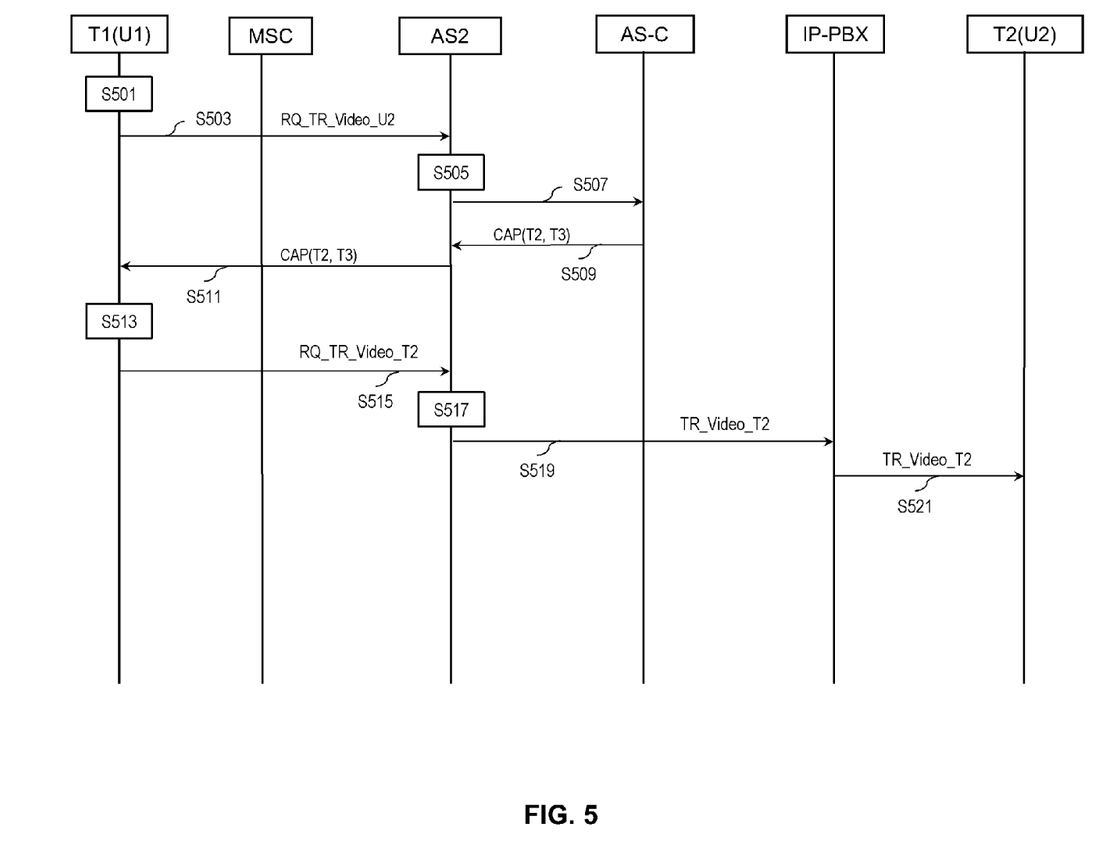

FIGS. 4 and 5 are signal exchange diagrams showing respectively first and second ways of using a database implemented by a management server of the invention.

In the example of FIG. 4, the global environment of FIG. 2 corresponds to an enterprise, both for the mobile network portion (MOB) and for the enterprise network portion proper (ENT).

A service application server AS1 of the enterprise that is connected to the IMS network serves in particular to manage the access of terminals to the Intranet of the enterprise. In this example, an operator of the server AS1 triggers execution of a command in the server AS1 (step S401) in order to launch a process of updating a URL address for accessing the enterprise Intranet.

In step S403, the server AS1 sends a request to the AS-C management server in order to recover the list of the identifiers (ID(Ti)) for all of the user terminals that can connect to the entire network (MOB, ENT). The AS-C server recovers the requested list from the database (24) and transmits it (S405) to the server AS1. In similar manner (steps S407, S409), the server AS1 obtains from the AS-C management server the information (CAP(Ti)) relating to the capabilities of the terminals identified in the recovered list of identifiers (ID(Ti)). In step S411, the server AS1 uses the information about the capabilities of the terminal to determine which terminals have web browsers enabling them to access the enterprise Intranet.

Consequently, in step S413, the server AS1 sends a request (RQ_MAJ_MOB(@)) to the MSC equipment of the mobile network for updating the Intranet access URL for all of the mobile terminals of the network MOB that have browsers. The above-mentioned request is processed by the MSC, and for each mobile terminal (T1) among those terminals, a command (MAG_MOB(@)) is sent (S415) to the terminal (T1) causing the terminal to update its Intranet access URL.

Likewise, in step S417, the server AS1 sends a request (RQ_MAJ_ENT(@)) to the IP-PBX equipment of the enterprise network (ENT) for updating the Intranet access URL for all of the (mobile or fixed) terminals of the enterprise network (ENT) that have browsers. The above request is processed by the IP-PBX, and for each of the terminals involved (T2, T3), a command (MAJ_ENT(@)) is sent (S419) to the terminal, causing the Intranet access URL to be updated in the terminal.

In the example of use shown in FIG. 5, a user U1 of a smartphone type mobile terminal T1 connected to the mobile network MOB uses the terminal to access a content storage site hosted by the server application server AS2 on the IMS network (FIG. 2), and selects a video (step S501) for sharing with another user U2.

For this purpose, a content-sharing request (RQ_TR_Video_U2) is sent (S503) by the terminal T1 to the server AS2. This server then extracts (S505) an identifier of the user U2 from the request and accordingly sends (S507) a request to the AS-C management server for obtaining information about the terminals associated with the user U2.

In return (S509), the server AS2 receives information (CAP(T2,T3)) from the AS-C server about the capabilities of two terminals that have been identified for the user U2, a laptop PC T2 and a mobile telephone T3, both of these terminals being associated with the enterprise network ENT. The information (CAP(T2,T3)) about the capabilities of the terminals T2 and T3 is then sent by the application server AS2 to the terminal T1 of the user U1 (S511).

In step S513, the user U1 chooses to send the video to the terminal T2 of the user U2, since this terminal has superior video playback capabilities (screen size and resolution). Consequently, the user U1 causes the terminal T1 to send (S515) a request (RQ_TR_Video_T2) to the server AS2 for transferring the video to the terminal T2 of user U2.

The above request for transferring the video is then processed (S517) by the server AS2 and is then transformed into a video transfer command (TR_Video_T2)—e.g. in the form of a link (URL) for downloading—that is sent (S519) to the IP-PBX.

Finally, in step S521, the IP-PBX transfers the video transfer command (TR_Video_T2) to the terminal T2. The user U2 can then consult the video on the screen of the laptop PC T2.

Figure 6:
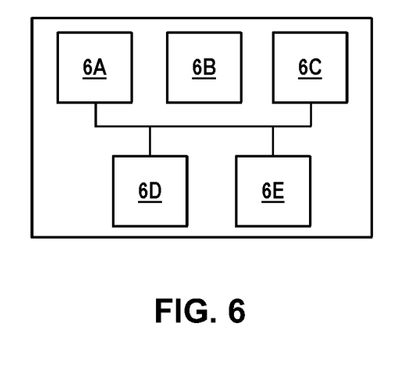
FIG. 6 shows the hardware architecture of a management server in accordance with the invention, suitable for performing a terminal management method of the invention.

FIG. 6 shows the hardware architecture of a management server in accordance with the invention suitable for performing a terminal management method of the invention.

In the presently-described embodiment, the management server has the hardware architecture of a computer; in particular it comprises a processor 6A, a ROM 6B, a random access memory (RAM) 6C, a non-volatile memory 6D (e.g. a hard disk), and communications means 6E for communicating in particular with entities of the IMS network, in particular the SCC-AS server, and applications servers (AS1-AS3) on the IMS network that provide services that can make use of the information in the database 24. By way of example, these communications means 6E incorporate a network card of known type and not described in detail herein.

The ROM 6B of the management server constitutes a data medium in accordance with the invention that is readable by the processor 6A and that stores a computer program in accordance with the invention including instructions for executing steps of a terminal management method of the invention, as described above with reference to FIG. 3.

In corresponding manner, the computer program defines functional modules of the management server suitable for performing these steps, and in particular: a module for determining the mobile terminals of the mobile network that are registered with the IMS network, and for determining the enterprise terminals that are registered with the IP-PBX equipment of the enterprise network; a module for obtaining the capabilities of any terminal that is determined as being registered either with the IMS network or with the IP-PBX equipment while a multimedia communications session involving the terminal in question is being initialized via the IMS network—the capabilities of a terminal being identified by at least one parameter from a set of parameters including a media type that can be accepted by the terminal and the bandwidth needed for setting up a multimedia communications session with the terminal; a module for updating a database with information identifying the mobile terminals of the mobile network that are registered with the IMS network and the terminals of the enterprise network that are registered with the IP-PBX equipment, and with information representative of the capabilities that have been obtained for each identified terminal; and in the chosen implementation as shown, a module for making available the information stored in the database on receiving a request from a determined piece of equipment of the environment.

Depending on the intended implementation, some or all of the above-specified modules constituting the management server of the invention may be implemented in an SCC-AS server complying with the ICS standard.

The invention claimed is:

1. A method of managing fixed and mobile terminals in an environment comprising an operator's mobile network including an internet protocol (IP) multimedia subsystem (IMS) network, an enterprise network including internet protocol-based private branch exchange (IP-PBX) equipment, and an interconnection IP network between the enterprise network and the mobile network, the method being performed in a management server and comprising:

determining the mobile terminals of the mobile network that are registered with the IMS network and the enterprise terminals that are registered with the IP-PBX equipment of the enterprise network;

while a multimedia communications session involving any terminal that is determined as being registered with the IMS network or with the IP-PBX equipment as the case may be, is being initialized via the IMS network, obtaining the capabilities of that terminal, which capabilities are defined by at least one parameter from a set of parameters including a media type that can be accepted by the terminal and the bandwidth needed for setting up a multimedia communications session with the terminal; and updating a database with information identifying the mobile terminals of the mobile network that are registered with the IMS network and the enterprise terminals that are registered with the IP-PBX equipment, and with information representative of the capabilities that have been obtained for each identified terminal.

2. A method according to claim 1, further including making information stored in the database available in response to a request from determined equipment of said environment.

3. A method according to claim 1, wherein the mobile terminals registered with the IMS network are determined by interrogating a Service Centralization and Continuity Application Server (SCC-AS) server of the IMS network in compliance with the IMS centralized service (ICS) standard.

4. A method according to claim 1, wherein the enterprise terminals registered with the IP-PBX equipment are determined by the management server as a result of communication with the IP-PBX equipment.

5. A method according to claim 4, wherein the management server periodically interrogates the IP-PBX equipment using a communications protocol based on the IP protocol in order to obtain a list of terminals registered with the IP-PBX equipment.

6. A method according to claim 4, wherein, while an enterprise network terminal is being registered with the IP-PBX equipment, the management server receives a message from the IP-PBX equipment providing information about the registration of the terminal.

7. A method according to claim 4, wherein the IP-PBX equipment periodically transmits to the management server a list of enterprise terminals registered with the IP-PBX equipment.

8. A method according to claim 3, wherein the capabilities of a terminal identified in the database are obtained by means of said SCC-AS server by analyzing signaling messages transmitted by said terminal while setting up a multimedia communications session via the IMS network.

9. A method according to claim 8, wherein the signaling messages are transmitted using the session description protocol (SDP).

10. A method according to claim 1, wherein said database is updated as soon as it is determined that a terminal is registered with the IMS network or with the IP-PBX equipment.

11. A method according to claim 2, wherein said database is made available by said management server via a web address pointing to said database and implemented in an application programming interface (API) type interface incorporated in a service application server on the IMS network or in a service application installed in a user terminal.

12. A management server for managing fixed and mobile terminals in an environment comprising an operator's mobile network including an internet protocol (IP) multimedia subsystem (IMS) network, an enterprise network including internet protocol-based private branch exchange (IP-PBX) equipment, and an interconnection IP network between the enterprise network and the mobile network, said management server comprising:

a processor; and a non-transitory computer-readable memory storing a determination module, an acting module and an updating module, wherein:

the determination module determines the mobile terminals of the mobile network that are registered with the IMS network and the enterprise terminals that are registered with the IP-PBX equipment of the enterprise network;

the acting module acts, while a multimedia communications session involving any terminal that is determined as being registered with the IMS network or with the IP-PBX equipment, is being initialized via the IMS network, to obtain the capabilities of that terminal, which capabilities are defined by at least one parameter from a set of parameters including a media type that can be accepted by the terminal and the bandwidth needed for setting up a multimedia communications session with the terminal; and the updating module updates a database with information identifying the mobile terminals of the mobile network that are registered with the IMS network and the enterprise terminals that are registered with the IP-PBX equipment, and with information representative of the capabilities that have been obtained for each identified terminal.

13. A server according to claim 12, further including a module for making information stored in the database available on request from determined equipment of said environment.

14. A Service Centralization and Continuity Application Server (SCC-AS) server complying with the internet protocol (IP) multimedia subsystem (IMS) centralized service (ICS) standard, said server including a management server for managing fixed and mobile terminals in an environment comprising an operator's mobile network including an IMS network, an enterprise network including internet protocol-based private branch exchange (IP-PBX) equipment, and an interconnection IP network between the enterprise network and the mobile network, said management server comprising:

a processor; and a non-transitory computer-readable memory storing a determination module, an acting module and an updating module, wherein:

the determination module determines the mobile terminals of the mobile network that are registered with the IMS network and the enterprise terminals that are registered with the IP-PBX equipment of the enterprise network;

the acting module acts, while a multimedia communications session involving any terminal that is determined as being registered with the IMS network or with the IP-PBX equipment as the case may be, is being initialized via the IMS network, to obtain the capabilities of that terminal, which capabilities are defined by at least one parameter from a set of parameters including a media type that can be accepted by the terminal and the bandwidth needed for setting up a multimedia communications session with the terminal; and the updating module updates a database with information identifying the mobile terminals of the mobile network that are registered with the IMS network and the enterprise terminals that are registered with the IP-PBX equipment, and with information representative of the capabilities that have been obtained for each identified terminal.

15. A non-transitory computer-readable medium storing a computer program for performing a method, when the program is executed by a processor, the method of managing fixed and mobile terminals in an environment comprising an operator's mobile network including an internet protocol (IP) multimedia subsystem (IMS) network, an enterprise network including internet protocol-based private branch exchange (IP-PBX) equipment, and an interconnection IP network between the enterprise network and the mobile network, the method being performed in a management server and comprising steps consisting in:

determining the mobile terminals of the mobile network that are registered with the IMS network and the enterprise terminals that are registered with the IP-PBX equipment of the enterprise network;

while a multimedia communications session involving any terminal that is determined as being registered with the IMS network or with the IP-PBX equipment as the case may be, is being initialized via the IMS network, obtaining the capabilities of that terminal, which capabilities are defined by at least one parameter from a set of parameters including a media type that can be accepted by the terminal and the bandwidth needed for setting up a multimedia communications session with the terminal; and updating a database with information identifying the mobile terminals of the mobile network that are registered with the IMS network and the enterprise terminals that are registered with the IP-PBX equipment, and with information representative of the capabilities that have been obtained for each identified terminal.

* * * * *